United States Patent [19]

Munakata et al.

[11] 3,870,698

[45] Mar. 11, 1975

[54] QUINTOMYCIN COMPOUNDS

[75] Inventors: Katsura Munakata, Nagoya; Takeshi Oda, Tokyo; Toshito Mori, Tokyo; Hisakatu Ito, Tokyo, all of Japan

[73] Assignee: Kowa Company Ltd., Nagoya, Japan

[22] Filed: Nov. 19, 1971

[21] Appl. No.: 200,524

Related U.S. Application Data

[63] Continuation-in-part of Ser. No. 737,333, June 17, 1968, abandoned.

[30] Foreign Application Priority Data

June 21, 1967 Japan.............................. 42-39296
June 15, 1968 Japan.............................. 43-40863

[52] U.S. Cl. ............ 260/210 AB, 195/80, 424/116, 424/181

[51] Int. Cl.........:................................ C07c 129/18
[58] Field of Search............................. 260/210 AB

[56] References Cited
UNITED STATES PATENTS
2,916,485    12/1959    Frohardt et al. ............. 260/210 AB OTHER PUBLICATIONS
Munakata et al., "Chem. Abst.," Vol. 74, 1971, p. 21885K.

*Primary Examiner*—Johnnie R. Brown
*Attorney, Agent, or Firm*—Sherman & Shalloway

[57] ABSTRACT

A novel antibiotic substance, named "Quintomycin" which belongs to the aminocyclitol group and which is produced by a novel soil ray fungus, *Streptomyces lividus* or its mutant, and a process for recovering such antibiotic.

4 Claims, 3 Drawing Figures

FIG.1 QUINTOMYCIN A

FIG.2 QUINTOMYCIN B

FIG.3 QUINTOMYCIN D

QUINTOMYCIN COMPOUNDS

This application is a continuation-in-part of application Ser. No. 737,333 filed June 17, 1968, now abandoned.

This invention relates to an antibiotic substance, "Quintomycin" which belongs to the aminocyclitol group and which is produced by a novel soil ray fungus, *Streptomyces lividus* or its mutant, and to a process for recovering it.

The above new fungus was deposited under the name of "No. 2230-N₁ strain" at Fermentation Laboratory of Technical Institute, 2, 5, 4-chrome, Inage-Higashi, Chiba-shi, Japan, with the deposit number of "No. 50 FLTI." The same fungus was later deposited under the name of *Streptomyces lividus* at Americal Type Culture Collection, with the deposit number of ATCC 21178.

The antibiotic substance was first termed "No. 2230 substance," and later called "Quintomycin." It includes a novel antibiotic substance "Quintomycin-A expressed by the chemical name O-α-D-mannopyranosyl(1 → 4), α-L-2, 6-diamino-2, 6-dideoxy-idopyranosyl(1 → 3), β-D-ribofuranosyl-(1 → 5), O-[α-D-2-amino-2-deoxy-glucopyranosyl(1 → 4)], 1,3-diamino-1,2,3-trideoxy-myoinositol, corresponding to the structural formula and the empirical formula $C_{29}H_{55}N_5O_{18}$, and Rf-value of 0.50, the pentahydrochloride of which has a specific optical rotation $[\alpha]_D^{22}$ of $+ 50°$, and a decomposition point of 185° to 195°C and showing the infrared spectram as in the attached drawing, FIG. 2 and a novel antibiotic substance Quintomycin-D expressed by the chemical name O-α-L-2,6-diamino-2,6-dideoxy-idopyranosyl(1 → 3), β-D-ribofuranosyl(1 → 5), O-[α-D-2-amino-2,3-dideoxy-glucopyranisyl(1 → 4)] 1,3-diamino-1,2,3-trideoxy-myoinositol, corresponding to the structural formula and the empirical formula $C_{29}H_{55}N_5O_{19}$, and Rf-value of 0.23, the pentahydrochloride of which has a specific optical rotation $[\alpha]_D^{22}$ of $+ 59°$, decomposition point of 190° to 200°C and showing the infrared spectrum as in the attached drawing, FIG. 1, a novel antibiotic substance Quintomycin-B expressed by the chemical name O-α-D-mannopyranosyl(1 → 4), α-L-2,6-diamino-2,6-dideoxy-idopyranosyl(1 → 3), β-D-ribofuranosyl(1 → 5), O-[α-D-2-amino-2,3-dideoxy-glucopyranosyl(1 → 4)] 1,3-diamino--1,2,3-tridexoy-myoinositol, corresponding to the structural formula and the empirical formula $C_{23}H_{45}N_5O_{13}$, and Rf-value of 0.75, the pentahydrochloride of which has a specific optical rotation $[\alpha]_D^{22}$ of $+ 36°$ and a decomposition point of 198° to 208°C and showing the infrared spectrum as showing in the attached drawing, FIG. 3, and also Quinomycin-C which is regarded as a synonym for a known antibiotic substance "paromomycin" produced by *Streptomyces rimosus forma paromomycinus*. Other three antibiotic substances are novel substances.

The principal ingredients of the antibiotic substance Quintomycin of the present invention are novel antibiotic substances, Quintomycin-B and Quintomycin-A.

The Quintomycin of the invention, when containing these substances, especially Quintomycin-B, exhibits a high biological activity against *Pseudomonas aeruginosa*, and is exceedingly low in toxicity against warm-blooded animals. Known antibiotic substances having a high biological activity against the above bacterium are not satisfactory with respect of toxicity. The *Streptomyces lividus* of the present invention has the following microbiological properties.

I. Morphology

*Streptomyces lividus* n.s.p. first exhibits the growth of a light gray on synthetic media, which gradually becomes dark blue to black. The production of a soluble pigment is none, or in a rare substance, a soluble pigment of light rose or raspberry is formed. Aerial hyphae are short and irregularly branched in a single form. The formed sporophores are generally straight but, in a rare instance, of flexious loops (whorls or spirals are not formed). Three to 10 spores occur at the end of a sporophore. The structure of the spore surface as observed by an electronmicroscope is oval or ellipsoidal (0.2 × 0.3 – 0.5$\mu$).

II. Cultural characteristics on various media (Synthetic media)

| | | |
|---|---|---|
| Glycerol Czapek's agar | G: | moderate, light gray to dark blue or black |
| | A: | moderate, velvety, light gray to dark blue or black |
| | S: | none, rarely light rose or raspberry |
| Glucose-asparagine agar | G: | moderate, cream to dark blue or charcoal gray |
| | A: | moderate, velvety, light gray to dark blue |
| | S: | none |
| Calcium malate-agar | G: | moderate, white to shadow blue |
| | A: | very scant, white or light blue |
| | S: | none |

(Organic media)

| | | |
|---|---|---|
| Nutrient agar | G: | good, wrinkled moist yellowish brown or black |
| | A: | scant, light gray |
| | S: | none |
| Starch agar | G: | good, light gray to dark blue or black |
| | A: | velvety, white or light gray |
| | S: | none |
| Potato glucose agar | G: | moderate, dark blue or dark gray, slightly penetrating into medium |
| | A: | scant, light gray |
| | S: | none, rarely light rose |
| Peptone glucose agar | G: | good, dark blue or dark gray |
| | A: | scant, white to gray |
| | S: | brick red |
| Tyrosine agar | G: | moderate, pale brown to dark gray |
| | A: | slightly white |
| | S: | none or pale brown |
| Gelatin stab | G: | good, white or light gray |
| | A: | none |
| | S: | none |
| Litmus milk | G: | moderate, cream on surface |
| | A: | none |
| | S: | no change |

[ Note ]:
G: Growth, A: Aerial mycelium, S: Soluble pigment

III. Biochemical properties

| Reaction | |
|---|---|
| Chromogenic formation | negative |
| Tyrosinase | negative |
| Nitrate reduction | positive |
| Cellulose decomposition | negative |
| Milk coagulation | negative |
| Milk peptonization | positive |
| Hydrolysis of starch | positive (strong) |
| Gelatin liquefaction | positive (considerable) |

IV. The utilization of carbon sources

| Carbon source | Utilization | Carbon source | Utilization |
|---|---|---|---|
| D-Xylose | – | Sorbitol | ++ |
| L-Arabinose | – | D-Mannitol | ++ |
| D-Glucose | ++ | Dextrin | + |
| D-Galactose | ++ | Starch | + |
| D-Fructose | + | Rhamnose | – |
| D-Lactose | – | Inulin | – |
| D-Maltose | ++ | Dulcitol | – |
| Sucrose | – | Glycerol | ++ |
| D-Raffinose | + | Sodium citrate | + |
| Trehalose | ++ | Sodium acetate | + |
| L-Inositol | ++ | Calcium malate | + |

Reference to the classification given in Bergey's Manual of Determinative Bacteriology, 7th Ed. indicates that the new fungus of the present invention resembles *S. gedanensis* (*S. ged.*) in the following respects: Psychrophilic to mesophilic growth; no soluble pigment produced in organic media; proteolytic action strong; growth on synthetic media dark to black to almost bluish black; and a serial mycelium white to gray. *S. ged.* in a potato medium, however, shows a cream-colored to brownish growth, and produces no aerial mycelium and soluble pigment, while *S. lividus* (*S. liv.*) exhibits a dark gray or grayish black growth with a scant aerial mycelium and does not usually produce a soluble pigment although exhibiting a light rose color in a rare instance. On a starch medium, *S. ged.* exhibits a yellow to cream colored growth, and *S. liv.* exhibits a light gray to dark blue or black growth. *S. ged.* proves to be negative in milk peptonization and nitrate reduction, while *S. liv.* proves to be positive in both.

As strain which exhibit a psychrophilic to mesophilic growth and product no soluble pigment in organic media, there are *S. griseolus* (*S. gris.*) which exhibits a mouse-gray growth on synthetic media, produces a white to gray aerial mycelium, and forms straight sporophores, and *S. faciculus* which forms broom shaped sporophores. Comparison of these two strains with the *S. liv.* of the invention has revealed the following. In a nutrient agar, *S. gris.* exhibits a brownish growth with a smooth surface, produces a deep dull gray aerium mycelium, and produces no soluble pigment, while *S. liv.* exhibits a wrinkled moist yellowish brown growth and produces no soluble pigment with hardly any aerial mycelium. In a potato medium, *S. gris.* exhibits a cream-colored to black growth, forms an aerial mycelium of white greenish tinge and produces a brown to black soluble pigment, while *S. liv.* exhibits a dark gray or grayish black growth, forms a scant aerial mycelium, and produces no soluble pigment although exhibiting a light rose color in a rare instance. In gelatin, *S. gris.* gives rise to a yellowish flaky pellicle and sediment, and forms a white aerial mycelium and faint brown medium, while *S. liv.* exhibits a white or light gray growth, but produces no aerial mycelium and soluble pigment. In milk, *S. gris.* exhibits an abundant pink pellicle growth and slow coagulating, while *S. liv.* grows in cream on surface and does not coagulate.

*S. fasciculus* (*S. fasc.*) exhibits a good growth lichenoid and forms an aerial mycelium which is colorless, covered with dark gray, powdery or velvety, while *S. liv.* exhibits a light gray to dark blue or black growth, and forms a white or white gray aerial mycelium which is short and not so abundant. In a milk medium, *S. fasc.* proves to be positive both in coagulation and peptonization and exhibits a good growth on cellulose, while *S.*

*liv.* proves to be positive only in peptonization in milk medium, and does not grow on a cellulose medium.

With reference to S. A. Waksman, "The Actinomycetes," Vol. 2, comparison of characteristic properties of various series of Streptomyces will indicate that there is nothing which *S. liv.* belongs to. *S. intermedius, S. parvullus, S. craterifer, S. crat.* and *S. cellulosae* belonging to the series of Cinereus, however, might be regarded as being similar to *S. liv.* in that the spiral formation is + or −, melanin is − and an aerial mycelium is white to gray.

In a nutrient agar, *S. crat.* exhibits a colorless growth, and in a starch agar, it exhibits a spreading, thin and colorless growth and forms no aerial mycelium. In a potato medium, *S. crat.* exhibits a cream-colored growth and forms a white to mouse-gray aerial mycelium. On the other hand, *S. liv.* exhibits a good growth of wrinkled moist yellowish brown in a nutrient agar; exhibits a good growth of light gray to dark blue or black, and forms a velvety, white or light gray aerial mycelium in a starch agar; and exhibits a drak gray growth in a potato medium.

*S. cellulosae* grows well on cellulose and rapidly coagulates milk, and exhibits a yellow or lemon-yellow growth in a synthetic media. These are the points that differentiate it from *S. liv.*

*S. parvullus* differs fromm *S. liv.* in that it forms sporophores twisting into long closed spirals, exhibits a yellow growth in synthetic media, produces a yellow soluble pigment in gelatin, produces a brown soluble pigment and an abundant gray aerial mycelium in milk, and exhibits a very slow peptonization.

*S. liv.* of the invention also differs from *S. intermedius* in that the latter exhibits a good growth of olive-green in cellulose, exhibits a folded growth of brown to greenish-brown in a potato medium and produces an olive-green soluble pigment, and exhibits slow liquefaction in gelatin and produces a greenish-brown soluble pigment.

Except *S. griseolus, S. cellulosae* and *S. parvullus*, the above-mentioned known strains do not produce an antibiotic substance.

Reference will now be made to fungi of the genus Streptomyces which produce antibiotic substances belonging to be aminocyclitol group. *S. fradiae*, according to Waksman, exhibits a thin, smooth, colorless, occasionally orange-yellow substrate growth on synthetic media, and forms an aerial mycelium which is light pink, seashell-pink or salmon-colored. These will differentiate it from the *S. liv.* of the invention. Waksman's classification also indicates that *S. albogriseolus* exhibits a pink to reddish purple growth on a potato medium and the sporophores produce spirals. Consequently, it differs from the *S. liv. S. rimosus f. paromomyceinus, S. chrestmyceticus, S. kanamyceticus* and *S. pulveraceus* all exhibit a yellow or cream-colored to brown growth, and do not exhibit dark gray to dark blue or black growth as in *S. liv.*

Consequently, the Quintomycin-producing strain of the present invention has been identified as a novel strain belonging to the genus Streptomyces.

For the sake of reference, the details of microbiological properties of strains belonging to genus Streptomyces which will produce antibiotic substances belonging to the aminocyclitol group will be shown below under paragraphs (I) to (VI). The microbiological properties of strain belonging to other genera which will produce antibiotic substances belonging to the aminocyclitol group are also given under paragraphs (VII) and (VIII).

[I]
| | |
|---|---|
| Strain | *Streptomyces rimosus forma parmomycinus* |
| Antagonistic properties | Paromomycin |
| Morphology | Sporophores form dense clusters of spirals, and aerial mycelium is short and straight but rarely spiral |
| Glycerol-asparagine agar | G: cream-colored, becoming brownish to orange-brown with age<br>A: white<br>S: none |
| Calcium malate agar | G: yellowish brown<br>A: white<br>S: none |
| Nutrient agar | G: light cream-colored to yellowish-brown<br>A: none<br>S: none |
| Starch agar | G: cream-colored, with deeper brown center<br>A: absent or white<br>S: none |
| Potato agar | G: lichenoid, cream-colored to reddish-brown<br>A: white to gray to dark brown<br>S: yellowish-brown |
| Gelatin | G: cream-colored to brownish<br>A: white<br>S: none |
| Milk | G: heavy surface pellicle, cream-colored to yellowish<br>A: grayish-white |
| Nitrate reduction | positive |
| Cellulose decomposition | negative |
| Milk coagulation | negative |
| Milk peptonization | positive |
| Hydrolysis of starch | positive (limited) |
| Gelatin liquefaction | position (slowly) |

[II]
| | |
|---|---|
| Strain | *Streptomyces kanamyceticus* |
| Antagonistic properties | Kanamycin |
| Morphology | The aerial mycelium develops from the submerged mycelium on a few media and its branching is not profuse and it bears the sporophores at the end. Spirals and whorls are not observed in general. |
| Glycerol Czapek's agar | G: colorless, later changed to lemon yellow<br>A: white to yellow and occasionally bore greenish or faint pinkish tinge<br>S: occasionally faint brown |
| Glucose-asparagine agar | G: colorless to yellow with faint pinkish white<br>A: scant, white, faint pinkish white, greenish yellow or yellow<br>S: occasionally faint brown |
| Calcium malate agar | G: yellow<br>A: white-yellow |
| Nutrient agar | G: cream-colored<br>A: absent or white<br>S: none |
| Potato agar | G: Wrinkled, faint yellowish brown to yellow<br>A: scant, white<br>S: none |
| Nitrate reduction | positive |
| Milk coagulation | doubtful |
| Milk peptonization | doubtful |
| Hydrolysis of starch | positive |
| Gelatin liquefaction | positive |

[III]

| | |
|---|---|
| Strain | *Streptomyces fradiae* |
| Antagonistic properties | Neomycin |
| Morphology | Sporophores branched monopodially, straight or flexible, but no true spirals. On certain media, spirals are formed |
| Glucose-asparagine agar | G: restricted, glossy, buff-colored, lichenoid margin |
| | A: late, seashell-pink |
| Malate glycerol agar | G: orange |
| | A: seashell-pink |
| Nutrient agar | G: restricted, yellowish, becoming orange-yellow to buff |
| | A: none |
| | S: none |
| Starch media | G: spreading, colorless |
| | A: seashell-pink |
| Potato agar | G: restricted, orange-colored |
| | A: white to rose or pink |
| | S: absent or faint brown |
| Gelatin | G: dense, cream-colored to brownish |
| | A: white |
| | S: none |
| Litmus milk | G: cream-colored ring |
| | S: becoming alkaline |
| Nitrate reduction | negative |
| Cellulose decomposition | negative |
| Milk coagulation | positive |
| Milk peptonization | positive (rapid) |
| Hydrolysis of starch | positive |

[IV]

| | |
|---|---|
| Strain | *Streptomyces albogriseolus* |
| Antagonistic properties | Neomycin |
| Morphology | Sporophores monopodially branched, producing short, compact spirals, averaging 4 to 6 turns. Spores spherical or oval, covered with numerous long, fine hairs |
| Nutrient agar | A: white to ash-gray |
| Starch agar | A: white to dark gray |
| Milk | G: orange-colored ring |
| Nitrate reduction | positive |
| Milk peptonization | positive |
| Hydrolysis of starch | positive |
| Gelatin liquefaction | positive |

[V]

| | |
|---|---|
| Strain | *Streptomyces pulveraceus* |
| Antagonistic properties | Zygomycin (identical with Paromomycin) |
| Morphology | Aerial mycelium generally develops well. The sporophore forms spiral and the spore is spherical-ellipsoidal. The spiral adhering state. |
| Glycerol Czapek's agar | G: colorless, later faint brown |
| | A: powdery, light drab to light grayish olive |
| | S: none |
| Glucose-asparagine agar | G: orange to xanthin orange |
| | A: powdery, light grayish olive |
| | S: none or becoming ochraceous-buff |
| Calcium malate agar | G: yellow, penetrating into the medium |
| | A: none or scant, smoke gray |
| | S: none |
| Nutrient agar | G: colorless, folded |
| | A: none |
| | S: none |
| Starch agar | G: colorless to yellow ocher, penetrating deep into the medium |
| | A: scant, light grayish olive |
| | S: none |
| Tyrosine agar | G: colorless to faint brown |
| | A: light grayish olive |
| | S: none |
| Milk | G: colorless, surface growth |
| | S: brown |
| Nitrate reduction | positive (strong) |
| Cellulose decomposition | negative |
| Milk coagulation | negative |
| Milk peptonization | positive |
| Hydrolysis of starch | positive |
| Gelatin liquefaction | positive |

[VI]

| | |
|---|---|
| Strain | *Streptomyces chrestomyceticus* |
| Antagonistic properties | Aminosidin (identical with Paromomycin) |
| Morphology | Aerial mycelium are generally strength, but observed rarely hooks or spirals |
| Glucose-asparagine agar | G: yellow |
| | A: absent |
| Potato glucose agar | G: colorless |
| | A: scant white |
| Peptone glucose agar | G: good, white or cream-colored |
| | A: abundant white |
| Tyrosinase | positive |
| Milk coagulation | positive |
| Milk peptonization | negative (neutral) |
| Hydrolysis of starch | positive |
| Gelatin liquefaction | positive |

[VII]

| | |
|---|---|
| Strain | *Micromonospora purpurea* |
| Antagonistic properties | Gentamicin |
| Morphology | No aerial mycelium, colony raised, convolute abundant growth, waxy, no diffusible pigment. Surface: terra cotta. Reverse: russet. Mycelium long, branched, regular, nonseptate, 0.5µ in diameter. Sprorphores single, spores borne terminally, spores spherical to ellipsoidal, 1.0µ in diameter |
| Glucose-asparagine agar | G: fair, brite peach |
| Peptone glucose agar | G: good, burgundy |
| Nitrate reduction | positive |
| Gelatin liquefaction | positive (weak) |

[VIII]

| | |
|---|---|
| Strain | *Micromonospora echinospora* |
| Antagonistic properties | Gentamicin |
| Morphology | No aerial mycelium, colony raised, crenate-convolute good growth, waxy, slight amber diffusible pigment. Surface:deep red-brown. Reverse:russet. Mycelium long, branched, regular nonseptate. No spores |
| Glucose-asparagine agar | G: poor |
| Peptone glucose agar | G: good, burgundy |
| Nitrate reduction | variable |
| Gelatin liquefaction | positive |

The utilization of carbon sources of the above-mentioned fungi except (IV) are shown below together with the similar data for the novel *S. lividus* of the invention.

|  | Streptomyces lividus | Streptomyces kanamyceticus | Streptomyces fradiae | Streptomyces pulveraceus | Streptomyces rimosus f. paromomycinus | Streptomyces chrestomyceticus | Micromonospora purpurea | Micromonospora echinospora |
|---|---|---|---|---|---|---|---|---|
| L-Arabinose | − | + | + | ± | ± |  | + | + |
| Rhamnose | − | − | − | ++ | − |  | + | + |
| D-Xyrose | − | − | + | ++ | − |  | + | + |
| D-Glucose | ++ |  | + |  | ++ | + | + | + |
| D-Galactose | ++ | + | ± | ++ | ++ | + | ± | ± |
| D-Fructose | + | + | − | + | ++ | + |  |  |
| D-Lactose | − | − | − | ++ | ++ | + | ± | ± |
| D-Maltose | ++ | + | + | ++ | ++ | + |  |  |
| Sucrose | − | + | − |  | − |  | + | + |
| Trehalose | ++ |  |  |  | ++ | + | + | + |
| D-Raffinose | + | + | − | ++ | − |  | − | − |
| Dextrin | + | + |  | ++ | ++ | + |  |  |
| Inulin | − | − | − | − | − | + |  |  |
| Starch | + | + |  |  | ++ |  | + | + |
| Dulcitol | − |  |  | − | − |  | − | − |
| Glycerol | ++ | + | + |  | ++ | + | − | − |
| L-Inositol | ++ | − |  | − | ++ |  | − | − |
| D-Mannitol | ++ | + | − |  | ++ | + | − | − |
| Sorbitol | ++ | ± | − | + | ++ | + | − | − |

According to the invention, a process is provided for preparation of a novel and useful antibiotic substance, which comprises culturing *Streptomyces lividus* or its mutant under aerobic conditions in a medium containing at least a carbon source and a nitrogen source, and recovering Quintomycin from its culture broth. The culture medium may contain an inorganic substance (mineral) besides the carbon source and nitrogen source.

Various substances known in the culturing art can be used as the carbon and nitrogen sources. Examples of the carbon source are starch, glucose, glycerol, maltose, inositol, fructose, dextrin, sucrose and galactose. As the nitrogen source, mention can be made of a yeast extract, polypeptone, dry yeast, meat extract, corn-steep liquor, soybean meal, inorganic nitrate and ammonium salt.

Examples of the mineral are sodium chloride, dipotassium hydrogenphosphate, magnesium sulphate, iron sulphate, calcium chloride, calcium carbonate, calcium hydroxide, iron chloride, zinc sulphate and cobalt chloride.

The culturing can be carried out under aerobic conditions either in a solid culture medium or a liquid medium. It is preferable to effect the culturing in a liquid medium under aerobic conditions. In the liquid culturing under aerobic conditions, known antifoamers such as fluid paraffin, fatty oil and silicon oil can be used.

The culturing temperature is about 20° to 39°C., preferably about 25° to 37°C. It is advisable that the culturing should be carried out while the pH of the culture medium is adjusted to about 6.6 – 7.5, preferably 7.0 ± 0.3. The period of culturing is usually at least 2 days. For instance, a period of 2 days to 2 weeks, or 2 days to 1 week, will suffice. If desired, culturing for a longer period is possible, but not necessary. When the production of Quintomycin in the culture broth is in a sufficient amount, preferably when it reaches almost a maximum, the culturing is stopped, and Quintomycin in the broth is recovered. The recovery can be effected either by a procedure in which the broth is adsorbed by an adsorbent and then eluted by a suitable eluting liquid or by a procedure in which solvent extraction is made by using a suitable solvent, the former being preferable. When the adsorbing and eluting procedure is employed, a suitable adsorbent is added to the culture broth to adsorb the intended product sufficiently under sitrring, for instance, and after the removal of waste broth with mycelium, the adsorbent may be subjected to the eluting operation. It is also possible to add an adsorbent to the culture broth from which mycelium has been removed by a suitable means such as filtration and centrifugal separation and to follow the same procedure. Alternatively such mycelium-removed broth is passed through a column packed with a suitable adsorbent, and is then subjected to the same procedure.

Any solid adsorbent which adsorbs the intended product and from which the intended product can be eluted by a suitable eluting liquid may be used in the above adsorbing procedure, but the use of cationic exchangers is preferable. Expecially preferable is the use of weakly acidic cationic exchange resins. Specific examples of the cationic exchangers are Amberlite IRC - 50, Amberlite IRC - 84, Amberlite CG - 50 (tradenames) and carboxymethyl cellulose. Besides these, other solid adsorbents such as cellulose powder, activated carbon, alumina gel, silica gel and alumina/silica gel are usable.

As the eluting liquid, the use of aqueous solution of acids such as inorganic and organic acids and aqueous solutions of alkaline materials such as caustic alkalis, ammonia and ammonium salts is preferable.

These acids include mineral acids such as hydrochloric acid, sulfuric acid and phosphoric acid and a lower aliphatic acids such as acetic acid and formic acid. It is advisable that these acids should be used in the form of aqueous solutions having a concentration of about 0.1 – 1.0 N. Examples of the above-mentioned alkaline materials are caustic soda, caustic potash, ammonia and ammonium formate. It is advisable that these alkaline materials should be used in concentrations of about 0.1 – 3.0 N. Of these, the use of mineral acids or aqueous ammonia is recommended.

The pH of the obtained eluate is, if desired, adjusted to a value in the vicinity of neutrality, and by removing the liquid content at the lowest possible temperature, the intended Quintomycin can be obtained as a solid powder. The removal of the liquid content can be effected by any of the various known means. For instance, such means as lyophilizing or spray drying are preferable. If the operation is made at the lowest possible temperature, heating under reduced pressure can also be used. Alternatively a concentration-vacuum drying means may be employed under the conditions such as to form a stable salt like the hydrochloride and sodium salt. Furthermore, Quintomycin in the eluate can be made into a solid powder by extracting the eluate with a suitable extracting solvent, and removing the solvent at the lowest possible temperature.

When activated carbon is used as a solid adsorbent, an aqueous solution of the acid is used as an eluting liquid. In this case, acetone and lower aliphatic alcohols such as methanol and ethanol adjusted to a pH of less than 5, preferably less than 4 can be preferably used besides the above-exemplified acids.

When the recovery of Quintomycin from the culture broth is carried out by solvent-extraction, higher fatty acids such as lauric acid and stearic acid are used as assistants. As the solvent, water-immiscible aliphatic alcohols are usable. Preferable alcohols are, for example, n- or iso-butanol and amyl alcohol. An alcohol layer is separated by decantation or other known means of separation into two layers, and the alcohol is evaporated at the lowest possible temperature. As such means, spray drying is advantageously utilizable besides heating under reduced pressure.

It is preferable, as mentioned above, that Quintomycin of the present invention should be recovered by the adsorption and eluting procedure or solvent-extraction. As long as the Quintomycin in the culture broth is not substantially destroyed, any means of separating a solid material dissolved in a broth liquid can be employed.

The obtained novel antibiotic substance, Quintomycin is a white to white gray solid substance and can be used as an antibiotic substance in a wide range of fields as it is, or if desired, after having been refined by repeated application of the above-mentioned recovery means. If further desired, the obtained Quintomycin can be separated into four antibiotic substances. These antibiotic substances, as mentioned before, were named Quintomycin-A, Quintomycin-B, Quintomycin-C and Quintomycin-D. Quintomyin-A, Quintomycin-B and Quintomycin-D are novel substances. The Quintomycin of the invention consists predominantly of Quintomycin-B.

Means for separating the Quintomycin into these four substances will be described.

When the Quintomycin separated from the culture broth is again dissolved in water, or is eluted with an aqueous solution of an acid or an alkaline substance as mentioned above, it can be separated by chromatography into Quintomycin-A, Quintomycin-B, Quintomycin-C and Quintomycin-D while the pH of the eluting liquid is being maintained at 6.2 – 12 with or without adjustment.

Both cationic exchangers and anionic exchangers are suitable. For instance, with the use as a column of a cationic exchanger, preferably weakly acidic cationic exchanger, such as Amberlite IRC - 50, Amberlite IRC - 84, Amberlite CG - 50 (tradenames), carboxymethyl cellulose and CM-Sephadex (tradename), an aqueous solution of the Quintomycin adjusted to a pH of 6.2 – 12 is caused to be adsorbed by the column, followed by developing. Subsequently, with the use of aqueous ammonia or an aqueous solution of ammonium formate as an eluting liquid, the Quintomycin is separated by a gradient or stepwise method.

According to the gradient method, under the operating conditions given in Example 4 below, Quintomycin-A is eluted in sections 45 – 50; Quintomycin-B, in sections 53 – 58; Quintomycin-C, in sections 88 – 90; and thereafter, Quintomycin-D is eluted. According to the stepwise method, Quintomycin-A is first eluted by a 0.1 N aqueous ammonia, and then Quintomycin-B, by aqueous ammonia of the same normality. Quintomycin-C is eluted by a 0.15 N aqueous ammonia, and then Quintomycin-D, by a 0.3 N aqueous ammonia.

It is also possible to separate the Quintomycin by developing an aqueous solution of the Quintomycin with the use as a column of an anionic exchanger, preferably a strongly basic anionic exchanger, such as Dowex 1 × 2 OH type (tradename), Amberlite 400 (tradename), and then eluting it with water, whereby Quintomycin-D, Quintomycin-C, Quintomycin-B and Quintomycin-A are sequentially eluted.

Each of the separated components can be further refined by chromatography with the use of activated carbon, alumina or cellulose as a column and acetone or lower alcohol acidified with a mineral acid such as hydrochloric acid, sulphuric acid and nitric acid or a lower aliphatic acid such as acetic acid as an eluting liquid. It can also be purified by converting it into its picrate or Reinecke's salt, and changing it into a proper inorganic salt by a salt exchange means.

The novel antibiotic substance of the invention has novel and useful antibiotic activities as set out in the beginning of the specification. This will be detailed below.

1. Characteristics

Quintomycin-A, Quintomycin-B and Quintomycin-D are basic substances. The free base, hdyrochloride and sulphate of each of these substances are white amorphous powder.

2. Solubility

Quintomycin-A, Quintomycin-B and Quintomycin-D, in their free base, hydrochloride and sulphate form, are soluble in water, an aqueous solution of caustic alkali, lower aliphatic acid and mineral acid. They are soluble in methyl alcohol in their free base form, but are very difficulty-soluble or insoluble in $C_4$ or higher aliphatic alcohols, ketones and ethers.

3. Color Reaction

Quintomycin-A, Quintomycin-B and Quintomycin-D prove to be positive in Molisch reaction, Elson-Morgan's reaction, Abderhalden's reaction (ninhydrin reaction) and Bile's reaction; exhibit a deep red purple color in Tollens reaction (phloroglucine hydrochloride); and prove to be negative in Fehling reaction, Benedict reaction, Biuret reaction, Ehrlich reaction and Sakaguchi reaction.

Quintomycin-A and Quintomycin-B exhibit a purple color in Skatol reaction, but Quintomycin-D does not.

4. Stability

Quintomycin-A, Quintomycin-B and Quintomycin-D as their 1 N aqueous hydrochloric acid solution are unstable when heated to 100°C. for 30 minutes, but are stable at room temperature. They are stable in their 1 N caustic soda aqueous solution both when heated to 100°C. for 30 minutes and at room temperature.

5. $R_f$ value

The $R_f$ value determined by an alumina thin-layer chromatography ($R_f$ values in the claims of the present application are determined by this method) with the use of upper layer of mixed solvent of chloroform/methanol/17 percent aqueous ammonia (volume ratio of 2:1:1) as a developing liquid is 0.23 for Quintomycin-A, 0.50 for Quintomycin-B and 0.75 for Quintomycin-D. Some known antibiotic substances have the following $R_f$ values as determined by the above procedure.

Kanamycin (product of *Streptomyces kanamyceticus*), 0.75; Paromomycin (product of *Streptomyces rimosus f. paromomycinus*), 0.70; Neomycin (product of *Streptomyces fradiae* or *Streptomyces albogriseolus*), 0.74; and Gentamicin (product of *Micromonospora echinospora*), 0.81.

The $R_f$ value determined by a paperchromatography with the use of a methanol/3 percent NaCl aqueous solution (volume ratio of 2:1) as a developing liquid and Toyl Filter Pater No. 51A (product of Toyo Filter Paper Co., Ltd. Japan) is 0.25 for Quintomycin-A, and 0.27 for Quintomycin-B. The $R_f$ values determined by this procedure of some known antibiotic substances are as followed: Kanamycin, 0.36; Paromomycin, 0.31; Neomycin, 0.20; and Gentamicin, 0.53.

6. Ultraviolet rays absorption spectra

None of Quintomycin-A, -B and -D exhibit a characteristic absorption at the long wave length of from 250 m$\mu$.

7. Infra-red rays absorption spectra

Figure 1:
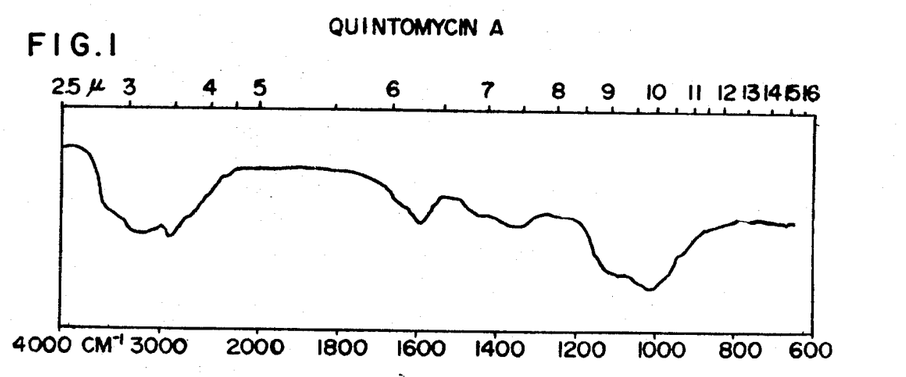
Figure 2:
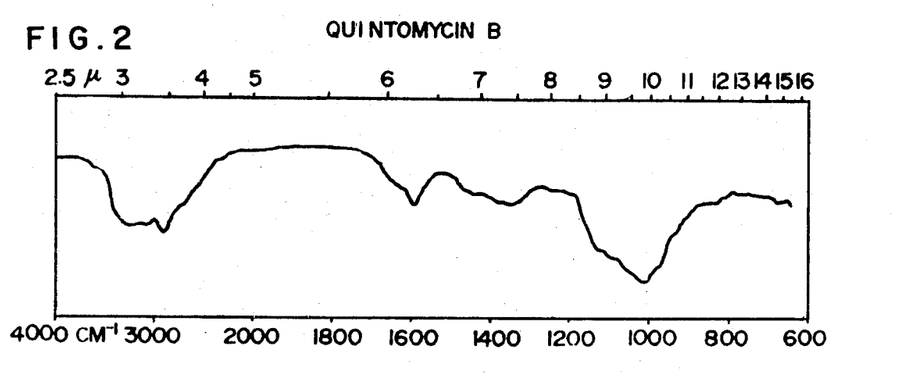
Figure 3:
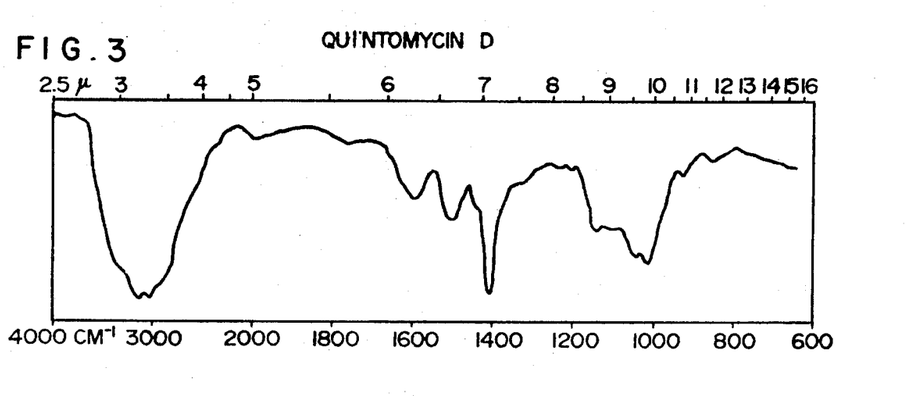

The infra-red absorption spectra of Quintomycin-A, -B and -D pelletized in potassium bromide are shown in FIGS. 1, 2 and 3, respectively.

Other properties of the antibiotic substances of the invention are shown in the following Table together with those of other known antibiotic substances.

Table (1)

| Name of Antibiotic substance | Quintomycin-A | Quintomycin-B | Quintomycin-C | Quintomycin-D |
|---|---|---|---|---|
| Produced by | S. lividus | S. lividus | S. lividus | S. lividus |
| Melting point (M.P.) °C (dec.) | (Free) 197–203 (-HCl) 195 | (Free) 197–203 (-HCl) 190 | (-HCl) 203 (same as the paromomycin) | (Free) 178–184 (-HCl) 203 |
| $[\alpha]_D +°$ | (-HCl) $[\alpha]_D^{22}$ =59 (c=1, H$_2$O) | (-HCl) $[\alpha]_D^{22}$ =59 (c=1, H$_2$O) | | (-HCl) $[\alpha]_D^{22}$ =35.8 (C=0.5, H$_2$O) |
| Molecular formula | C$_{29}$H$_{55}$N$_5$O$_{19}$ | C$_{29}$H$_{55}$N$_5$O$_{18}$ | C$_{23}$H$_{45}$N$_5$O$_{14}$ | C$_{23}$H$_{45}$N$_5$O$_{13}$ |
| Molecular weight (M.W.) | 777.77 | 761.77 | 615.63 | 599.63 |
| Analysis (%) | c.   f. C:44.77 C:45.16 H: 7.07 H: 7.05 N: 9.01 N: 8.73 | c.   f. C:45.72 C:46.23 H: 7.22 H: 7.70 N: 9.19 N: 9.14 | (same as the paromomycin) | c.   f. C:46.07 C:46.40 H: 7.56 H: 7.59 N:11.68 N:11.33 |
| (Components of the substance | | | | |
| Mannose | + | + | (same as the paromomycin) | − |
| Ribose | + | + | | + |
| Deoxystreptamine | + | + | | + |
| Monoaminosugar | + | + | | + |
| Diaminosugar | + | + | | + |

Table (1a)

| Name of Antibiotic substance | Kanamycin-A | Kanamycin-B | Kanamycin-C |
|---|---|---|---|
| Produced by | S.kanamyceticus | S.kanamyceticus | S.kanamyceticus |
| Melting point (M.P.) °C (dec.) | (Free) 263–268 | (Free) 170–190 | (Free) ca. 270 |
| $[\alpha]_D +°$ | (Free) $[\alpha]_D^{24}$ =146 (c=1, 0.1N H$_2$SO$_4$) | (Free) $[\alpha]_D^{24}$ =126 (c.=0.7, H$_2$O) | (Free) $[\alpha]_D^{20}$ =126 (c=1, H$_2$O) |
| Molecular formula | C$_{18}$H$_{36}$N$_4$O$_{11}$ | C$_{18}$H$_{37}$N$_5$O$_{10}$ | C$_{18}$H$_{36}$N$_4$O$_{11}$ |
| Molecular weight (M.W.) | 484.51 | 482.51 | 484.51 |
| Analysis (%) | c. C:44.62 H: 7.49 N:11.56 | c. C:44.80 H: 7.51 N:14.72 | c. C:44.62 H: 7.49 N:11.56 |
| (Components of the substance) | | | |
| Mannose | − | − | − |
| Ribose | + | − | − |
| Deoxystreptamine | + | + | + |
| Monoaminosugar | − | + | + |
| Diaminosugar | − | + | − |

Table (2)

| Names of Antibiotic substance | Quintomycin-A | Quintomycin-B | Quintomycin-C | Quintomycin-D | Kanamycin-A | Kanamycin-B | Kanamycin-C |
|---|---|---|---|---|---|---|---|
| (Biol. activity, M.I.C. mcg/ml.) Staph. aureus 209p | 1.56 | 0.8 | (same as the paromomycin) | | 0.4 | 0.8 | |

Table (2) — Continued

| Names of Antibiotic substance | Quintomycin-A | Quintomycin-B | Quintomycin-C | Quintomycin-D | Kanamycin-A | Kanamycin-B | Kanamycin-C |
|---|---|---|---|---|---|---|---|
| S. citreus | 3.12 | 0.8 | | 1.56 | 3.12 | | |
| S. albus | 0.8 | 0.4 | | 0.1 | 0.8 | | |
| Strept. faecalis | 100 | 100 | | 50 | 12.5 | | |
| Sarcina lutea | 100 | >100 | | 1.56 | 3.12 | | |
| Bacillus subtilis | 0.8 | 0.8 | | 0.8 | 0.2 | | |
| B. cereus | 1.56 | 31.2 | | 0.8 | 1.56 | | |
| B. anthracis | 1.56 | 1.56 | | 0.4 | | | |
| Escherichia coli | 6.25 | 6.25 | | 3.12 | 1.56 | | |
| Kreb. pneumoniae | 6.25 | 3.12 | | 6.25 | 3.12 | | |
| Prot. vulgaris | 12.5 | 12.5 | | 12.5 | 12.5 | | |
| Salmonella typhi | 6.25 | 1.56 | | 1.56 | 1.56 | | |
| Shigella flexneri | 6.25 | 12.5 | | 12.5 | 6.25 | | |
| Pseudo. aeruginosa | 100 | 3.12 | | 3.12 | 25 | | |
| Mycobacterium 607 | 5.12 | 1.56 | | 1.56 | 1.56 | | |
| M. phlei | 3.12 | 1.56 | | 1.56 | 1.56 | | |
| Mycobacterium tuber | | 3.12 | | 3.12 | 3.12 | | |

Table (3)

| Names of Antibiotic substance | Quintomycin-A | Quintomycin-B | Quintomycin-C | Quintomycin-D | Kanamycin-A | Kanamycin-B | Kanamycin-C |
|---|---|---|---|---|---|---|---|
| (Toxicity in mice, $LD_{50}$ mg/kg) | | | | | | | |
| Intravenous | 198 | 193 | | 190 | 374.2 | | |
| Intraperitoneal | | | | | | | |
| Subcutaneous | 1878 | 1210 | | | 2282 | | |
| Synonym | | | Paromomycin | | | | |

Table (4)

| Name of Antibiotic substance | Neomycin-A | Neomycin-B | Neomycin-C |
|---|---|---|---|
| Produced by | S.fradiae S.albogriseolus | S.fradiae S.albogriseolus | S.fradiae S.albogriseolus |
| M.P. °C (dec.) | ($-H_2SO_4$) 250-6 | | |
| $[\alpha]_D +°$ | ($-H_2SO_4$)$[\alpha]_D^{22}=123$ (c=0.7, $H_2O$) | ($-H_2SO_4$)$[\alpha]_D^{22}=58$ (c=0.5, $H_2O$) | ($-H_2SO_4$) $[\alpha]_D^{22}=82$ (c=0.5, $H_2O$) |
| Molecular Formula | $C_{12}H_{26}N_4O_6$ | $C_{23}H_{46}N_6O_{13}$ | $C_{23}H_{46}N_6O_{13}$ |
| M.W. | 322.36 | 614.65 | 614.65 |
| Analysis (%) | c. C:44.71 H: 8.13 N:17.38 | c. C:44.94 H: 7.52 N:13.67 | c. C:44.94 H: 7.52 N:13.67 |
| (Components of the substance) | | | |
| Mannose | − | − | − |
| Ribose | − | + | + |
| Deoxystreptamine | + | + | + |
| Monoaminosugar | − | − | − |
| Diaminosugar | + | + | + |
| (Biol. activity M.I.C. mcg/ml.) | | | |
| Staph. aureus 209p | | 0.8 | |
| S. citreus | | 0.4 | |
| S. albus | | 0.4 | |

Table (4a)

| Name of Antibiotic substance | Paromomycin-I | Paromomycin-II | Gentamicin complex |
|---|---|---|---|
| Produced by | S.rimosus f. paramomycinus | S.rimosus f. paramomycinus | Micromonospora echinospora Micromonospora purpurea |
| M.P. °C (dec.) | | | $C_1$:94–100, $C_2$:107–124 |
| $[\alpha]_D +°$ | (-HCl) $[\alpha]_D^{25}=64$ (c=1, $H_2O$) | (-HCl) $[\alpha]_D^{24}=78$ | $C_1$: $[\alpha]_D^{25}=158(H_2O)$ $C_2$: $[\alpha]_D^{25}=160(H_2O)$ |

Table (4a) — Continued

| Name of Antibiotic substance | Paromomycin-I | Paromomycin-II | Gentamicin complex |
|---|---|---|---|
| Molecular Formula | $C_{23}H_{45}N_5O_{14}$ | $C_{23}H_{45}N_5O_{14}$ | $C_{17-18}H_{34-36}N_4O_7$ |
| M.W. | 615.63 | 615.63 | |
| Analysis (%) | c. | c. | |
| | C:44.87 | C:44.87 | |
| | H: 7.37 | H: 7.37 | |
| | N:11.38 | N:11.38 | |
| (Components of the substance) | | | |
| Mannose | − | − | − |
| Ribose | + | + | − |
| Deoxystreptamine | + | + | + |
| Monoaminosugar | + | + | + |
| Diaminosugar | + | + | − |
| (Biol. activity M.I.C. mcg/ml.) | | | |
| Staph. aureus 209p | 0.8 | | 0.8 |
| S. citreus | 1.56 | | 3.12 |
| S. albus | 0.2 | | 0.8 |

Table (5)

| Name of Antibiotic substance | Neomycin-A | Neomycin-B | Neomycin-C | Paromomycin-I | Paromomycin-II | Gentamicin complex |
|---|---|---|---|---|---|---|
| (Biol. activity M.I.C. mcg/ml.) | | | | | | |
| Strept. faecalis | | 12.5 | | 25 | | 6.25 |
| Sarcina lutea | | 1.56 | | 3.12 | | 0.4 |
| Bacillus subtilis | | 0.8 | | 0.4 | | 0.4 |
| B. cereus | | 1.56 | | 0.8 | | 0.8 |
| B. anthracis | | | | 1.6 | | 0.1 |
| Escherichia coli | | 1.56 | | 3.12 | | 3.12 |
| Kreb. pneumoniae | | 6.25 | | 3.12 | | 0.8 |
| Prot. vulgaris | | 6.25 | | 6.25 | | 1.56 |
| Salmonella typhi | | 6.25 | | 3.12 | | 0.8 |
| Shigella flexneri | | 6.25 | | 6.25 | | 3.12 |
| Pseudo. aeruginoas | | 12.5 | | >100 | | 0.8 |
| Mycobacterium 607 | | 0.8 | | 1.56 | | |
| M. phlei | | 3.12 | | 0.4 | | |
| (Toxicity in mice $LD_{50}$ mg/kg | | | | | | |
| Intravenous | | | | 90 | | 72 |
| Intraperitioneal | | | | | | 433 |
| Subcutaneously | | 220 | | 423 | | 484 |
| synonym | | Framycetin Streptothricin -$B_{II}$ | Streptothricin -$B_1$ | Aminosidin Catenulin Hydtoxymycin, Zygomycin | | |

The invention will be described further below by means of Examples.

EXAMPLE 1

*Streptomyces lividus* (Streptomyces No. 2230-$N_1$) strain was fermented in a medium sterilized and adjusted to a pH of 7.0 which consisted of 0.5 percent of starch, 2.0 percent of soybean meal, 0.1 percent of dipotassium hydrogenphosphate, 0.05 percent of magnesium sulphate and 0.3 percent of sodium chloride, and was pre-cultured at 27°C. for about 50 hours. Subsequently, 100 – 150 ml. of the preculture broth were added to 10 liters of the same culture medium and culturing was effected at 27°C. with stirring at a rate of 250 rpm while passing sterilized air at a rate of 10 liters/min. In 40 hours, the pH of the culture broth was 7.2 – 7.4, and the production of Quintomycin (No. 2230 substance) reached a maximum. The culture broth was filtered with the use of Celite as a filtering assistant to give 9.2 liters of a culture filtrate. The filtrating broth was stirred for 10 minutes together with 300 ml. of Amberlite IRC - 50 (tradename) (type H) resin, when the effective components were completely adsorbed by the resin. The resin was packed into a column, and washed thoroughly with water. Quintomycin was recovered by elution with a 0.5 N hydrochloric acid. The effective components were collected, and neutralized with a 10 N caustic soda to adjust the pH to 7.6 – 7.8. They were caused to be adsorbed by a column packed with 10 g of activated carbon for the purpose of purifying, washed with 0.01 percent of aqueous ammonia and then with water, and eluted with a 0.02 N hydrochloric acid/methanol (1:1). Methanol was removed by distillation under reduced pressure. Subsequent lyophilizing gave Quintomycin-A, Quintomycin-B, Quintomycin-C and Quintomycin-D complex hydrochloride in 1 g yield.

EXAMPLE 2

The pH of 10 liters of the culture broth prepared in the same manner as in Example 1 was adjusted to 7.0, and the culture broth was extracted twice with 10 liters of iso-butanol containing 5 percent lauric acid. The iso-butanol layer was dissolved in an aqueous solution hydrochloric acid having pH of 2.0 and neutralized with caustic soda, followed by concentration under reduced pressure and lyophilizing. Thus there was obtained 200g of crude powder of Quintomycin complex.

EXAMPLE 3

A culture broth obtained in the same manner as in Example 1 was passed through Amberlite IRC - 50 (tradename) (type $NH_4$) resin packed into a column, and the effective components were adsorbed completely by the resin. The resin was thoroughly washed with water, and eluted with a 1.0 N aqueous ammonia to separate effective components. These effective components were collected and treated with a 2N hydrochloric acid to adjust their pH to 6–7.8. Purification was effected by following the same procedure as in Example 1.

EXAMPLE 4

*Streptomyces lividus* strain was fermented in a medium sterilized and adjusted to a pH of 6.8 which consisted of 0.5 percent of starch, 0.05 percent of glucose, 2.0 percent of soybean meal, 0.2 percent of peptone, 0.05 percent of magnesium sulphate, 0.1 percent of dipotassium hydrogenphosphate and 0.3 percent of sodium chloride, and was pre-cultured at 35°C. for about 50 hours. Subsequently, 300 – 400 ml. of the preculture broth were added to 10 liters of the same medium, and culturing was effected at 35°C. with stirring at a rate of 200 rpm while passing sterilized air at a rate of 14 liter/-min. In 96 hours, the pH of the culture broth was 7.8 – 8.2, and the production of Quintomycin reached a maximum. The culture broth was stirred for 10 minutes together with 100 ml. of a weakly acidic ion exchange resin, Amberlite IRC - 84 (tradename) ($NH_4$ type,) when the effective components were completely adsorbed by the resin. After removal of the mycelium and waste broth by fractional filtration, the resin having adsorbed therein effective components was packed into a column, and was thoroughly washed with water, followed by elution with a 2.0 N aqueous ammonia. Effective components were collected and concentrated. They were adsorbed into a column having a size of 30 × 2,400 mm and packed with a weakly acidic cationic exchange resin for use in chromatography. Elution with a 0.1 N aqueous ammonia after eluting a pigment portion with a 0.08 N aqueous ammonia yielded Quintomycin-A, and Quintomycin-B after the end of elution of Quintomycin-A. Elution with a 0.15 N aqueous ammonia after the end of elution of Quintomycin-B led to the elution of Quintomycin-C. When elution with a 0.3 N aqueous ammonia was effected after the elution of Quintomycin-C, Quintomycin-D came out.

Concentrating and lyophilizing procedures gave pure Quintomycin-A, Quintomycin-B, Quintomycin-C and Quintomycin-D as free bases in yields of 650 mg, 4,200 mg, 40 mg, and 120 mg, respectively.

EXAMPLE 5

150 milligrams of Quintomycin complex obtained in Example 1 or 2 were dissolved into about 40 ml. of distilled water, and the solution was adsorbed into a column having a diameter of 1 cm packed with 30 ml. of carboxymethyl Sephadex C-25 (tradename) (type $NH_4$) followed by water-washing. With the use of 200 ml. of a 0.05 N aqueous ammonia and 200 ml. of a 1.0 N aqueous ammonia, elution was effected by a gradient method at a rate of 25 ml./hr. The eluate was recovered successively in sections each amounting to 4 ml. Quintomycin-A was eluted in sections 45 – 50; Quintomycin-B, in sections 53 – 58; and Quintomycin-C, in sections 88 – 90. Continuing the elution with aqueous ammonia having a concentration of 1.0 or more resulted in the elution of Quintomycin-D. Lyophilizing procedure gave pure Quintomycin-A, Quintomycin-B, Quintomycin-C and Quintomycin-D as free bases in yields of 31 mg, 49 mg, trace and 18 mg, respectively.

EXAMPLE 6

150 grams of Quintomycin complex obtained in Example 1 or 2 were dissolved into 40 ml. of distilled water, and the solution was adsorbed by a column with a diameter of 1 cm packed with 30 ml. of carboxymethyl Sephadex C-25 (tradename) (type $NH_4$) buffered with ammonium formate, followed by water-washing. With the use of 200 ml. of 0.5 mol ammonium formate solution and 200 ml. of 3.0 mol ammonium formate solution, elution was effected by a gradient method at a rate of 25 ml./hr. The eluate was recovered successively in sections each amounting to 3 ml. Quintomycin-A was eluted in sections 29 – 37; Quintomycin-B, in sections 40 – 45; and Quintomycin-C, in sections 78 – 80. Continuing the elution with 3.0 mol ammonium formate solution resulted in the elution of Quintomycin-D. Lyophilizing procedure gave pure Quintomycin-A, Quintomycin-B, Quintomycin-C and Quintomycin-D as free bases in yields of 35mg, 56 mg, trace and 19 mg, respectively.

EXAMPLE 7

One hundred and fifty grams of Quintomycin complex obtained in Example 1 or 2 was dissolved into 40 ml. of distilled water. The solution was adjusted to a pH of 7.0 with a 0.1 N aqueous ammonia, and adsorbed completely by 20 ml. of Amberlite CG - 50 (tradename) (type $NH_4$) packed into a column having a diameter of 1 cm. With the use of 200 ml. of a 0.02 N aqueous ammonia and 200 ml. of a 1.0 N aqueous ammonia, elution was effected by a gradient method at a rate of 25 ml./hr. The eluate was recovered successively in sections each amounting to 3 ml. Quintomycin-A was eluted in sections 29 – 35; Quintomycin-B in sections 40 – 50; and Quintomycin-C, in sections 88 – 92. Continuing the elution with a 1.0 N aqueous ammonia resulted in the elution of Quintomycin-D. Lyophilizing procedure gave pure Quintomycin-A, Quintomycin-B, Quintomycin-C and Quintomycin-D as free bases in yields of 33 mg, 52 mg, trace and 16 mg, respectively.

EXAMPLE 8

Free bases of Quintomycin-A, Quintomycin-B, Quintomycin-C and Quintomycin-D obtained in Example 3 were each dissolved into methanol. Addition of a 2 N sulphuric acid to the resulting methanol solution led to the precipitation of a sulphate of each Quintomycin. The precipitate was thoroughly washed with methanol acetone, and a pure sulphate of each Quintomycin was obtained.

Free bases of the Quintomycin-A, Quintomycin-B, Quintomycin-C and Quintomycin-D were dissolved into methanol and acidified with a 2 N hydrochloric acid. Addition of acetone to each of the resulting methanol solution led to the precipitation of a hydrochloride of each Quintomycin. The precipitate was washed thoroughly with acetone ether, and a pure pentahydrochloride of each Quintomycin was obtained.

We claim:

1. Antibiotic Quintomycin of the aminocyclitol group which inhibits the growth of gram-positive bacteria, gram-negative bacteria, and acid-fast bacteria, and contains at least one compound expressed by the chemical name O-α-D-mannopyranosyl(1 → 4), α-L-2,6-diamino-2,6-dideoxy-idopyranosyl(1 → 3), β-D-ribofuranosyl (1 → 5) O-[α-D-2-amino-2-deoxy-glucopyranosyl(1 → 4)] 1,3-diamino-1,2,3-trideoxy-myoinositol, corresponding to the structural formula and the empirical formula $C_{29}H_{55}N_5O_{19}$, an Rf-value of 0.23, the pentahydrochloride of which has a specific rotation $[\alpha]_D^{22}$ of + 59° and a decomposition point of 190° to 200°C, and showing the infrared spectrum as in FIG. 1, a compound expressed by the chemical name O-α-D-mannopyranosyl(1 → 4), α-L-2,6-diamino-2,6-dideoxy-idopyranosyl(1 → 3), β-D-ribofuranosyl(1 → 5), O-[α-D-2-amino-2,3-dideoxy-glucopyranosyl(1 → 4)] 1,3-diamino-1,2,3-trideoxy-myoinositol, corresponding to the structural formula and the empirical formula $C_{29}H_{55}N_5O_{18}$, an Rf-value of 0.50, the pentahydrochloride of which has a specific optical rotation $[\alpha]_D^{22}$ of + 50° and a decomposition point of 185° to 195°C and showing the infrared spectrum as in FIG. 2 and a compound expressed by the chemical name O-α-L-2,6-diamino-2,6-dideoxy-idopyranosyl (1 → 3), β-D-ribofuranosyl(1 → 5), O-[α-D-2-amino-2,3-dideoxy-glucopyranosyl(1 → 4)] 1,3-diamino-1,2,3-trideoxy-myoinositol, corresponding to the structural formula and the empirical formula $C_{23}H_{45}N_5O_{13}$, an Rf-value of 0.75, the pentahydrochloride of which has a specific optical rotation $[\alpha]_D^{22}$ of + 36° and a decomposition point of 198° to 208°C and showing the infrared spectrum as in FIG. 3.

2. Quintomycin-A according to claim 1, expressed by the chemical name O-α-D-mannopyranosyl(1 → 4), α-L-2,6-diamino-2,6-dideoxy-idopyranosyl(1 → 3), β-D-ribofuranosyl(1 → 5), O-[α-D-2-amino-2-deoxy-glucopyranosyl(1 → 4)] 1,3-diamino-1,2,3-trideoxy-myoinositol.

3. Quintomycin-B according to claim 1, expressed by the chemical name O-α-D-mannopyranosyl(1 → 4), α-L-2,6-diamino-2,6-dideoxy-idopyranosyl(1 → 3), β-D-ribofuranosyl(1 → 5), O-[β-D-2-amino-2,3-dideoxy-glucopyranosyl(1 → 4)] 1,3-diamino-1,2,3-trideoxy-myoinositol.

4. Quintomycin-D according to claim 1 expressed by the chemical name O-α-L-2,6-diamino-2,6-dideoxy-idopyranosyl (1 → 3), β-D-ribofuranosyl(1 → 5), O-[α-D-2-amino-2,3-dideoxy-glucopyranosyl (1 → 4)] 1,3-diamino-1,2,3-trideoxy-myoinositol.

* * * * *